(12) United States Patent
Wexler et al.

(10) Patent No.: US 8,447,105 B2
(45) Date of Patent: May 21, 2013

(54) DATA DRIVEN INTERPOLATION USING GEODESIC AFFINITY

(75) Inventors: Yonatan Wexler, Redmond, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 12/794,982

(22) Filed: Jun. 7, 2010

(65) Prior Publication Data

US 2011/0299766 A1    Dec. 8, 2011

(51) Int. Cl.
*G06K 9/00*    (2006.01)
*G06K 9/62*    (2006.01)
*G06K 9/32*    (2006.01)

(52) U.S. Cl.
USPC ........... 382/167; 382/155; 382/162; 382/165; 382/300

(58) Field of Classification Search
None
See application file for complete search history.

(56) References Cited

U.S. PATENT DOCUMENTS

| | | | |
|---|---|---|---|
| 6,539,126 | B1 | 3/2003 | Socolinsky et al. |
| 6,791,540 | B1 | 9/2004 | Baumberg |
| 7,236,628 | B2 * | 6/2007 | Chen et al. ..................... 382/167 |
| 7,583,275 | B2 | 9/2009 | Neumann et al. |
| 2006/0251324 | A1 | 11/2006 | Bachmann et al. |
| 2011/0129164 | A1 * | 6/2011 | Lin et al. ........................ 382/254 |

FOREIGN PATENT DOCUMENTS

WO     0133511 A2    5/2001

OTHER PUBLICATIONS

Dijkstra ("A Note on two problems in connexion with graphs", Nemerische Mathematik, 1:269-271, 1959).*
Yegnanarayanan et al. ("Graph Models for Social Relations", Electronic Notes in Discrete Mathematics 33 (2009) 101-108).*
Cardenes et al. ("Fast and accurate geodesic distance transform by ordered propagation", Image and Vision Computing, 28, 307-316, 2010).*
Xiao, et al., "View Interpolation for Dynamic Scenes", Retrieved at << http://citeseerx.ist.psu.edu/viewdoc/summary?doi=10.1.108.2790>>, 2002, p. 10.
Shiroma, et al., "Dynamic Scene View Interpolation with Multiple Moving Objects using Layered Representation", Retrieved at << http://ieeexplore.ieee.org/stamp/stamp.jsp?tp=&arnumber=1389642>>, Proceedings, 2004 IEEE/RSJ International Conference on Intelligent Robots and Systems, (IROS 2004), vol. 2, Sep. 28-Oct. 2, 2004, pp. 1710-1715.

(Continued)

*Primary Examiner* — Tom Y Lu
*Assistant Examiner* — Thomas Conway
(74) *Attorney, Agent, or Firm* — Microsoft Corporation (57) ABSTRACT

Often, information regarding images and/or other data may be incomplete. For example, an image may have depth information associated with a portion of the image, but not the entire image. It may be advantageous to extrapolate the values from the known points to the entire image. Accordingly, a dimensional array representing an image (or other data) may be traversed one or more times to generate an interpolated table. The interpolated table may comprise pixels of unknown value, where a pixel of unknown value may be associated with a number of pixels with known values. In this way, values for pixels may be specified based upon values of pixels having known values.

20 Claims, 8 Drawing Sheets

OTHER PUBLICATIONS

Vedula, et al., "Image-Based Spatio-temporal Modeling and View Interpolation of Dynamic Events", Retrieved at << http://delivery.acm.org/10.1145/1070000/1061351/p240-vedula.pdf?key1=1061351&key2=0319466621&coll=GUIDE&dl=GUIDE&CFID=78684996&CFTOKEN=76711719>>, ACM Transactions on Graphics (TOG), vol. 24, No. 2, Apr. 2005, pp. 240-261.

Saito, et al., "View Interpolation of Multiple Cameras Based on Projective Geometry", Retrieved at << http://citeseerx.ist.psu.edu/viewdoc/summary?doi=10.1.1.6.5162>>, In International Workshop on Pattern Recognition and Understanding for Visual Information, 2002, pp. 6.

Rander, et al., "Recovery of Dynamic Scene Structure from Multiple Image Sequences", Retrieved at << http://ieeexplore.ieee.org/stamp/stamp.jsp?arnumber=00572192 >>, Proceedings of the IEEE/SICE/RSJ International Conference on Multisensor Fusion and Integration for Intelligent Systems, 1996, pp. 305-312.

Kanade, et al., "Virtualized Reality: Perspectives on 4D Digitization of Dynamic Events", Retrieved at << http://ieeexplore.ieee.org/stamp/stamp.jsp?tp=&arnumber=4178158 >>, IEEE Computer Graphics and Applications, vol. 27, No. 3, May 2007, pp. 32-40.

Kim, et al., "Multi-view Image and ToF Sensor Fusion for Dense 3D Reconstruction", Retrieved at << http://www.mpi-inf.mpg.de/~theobalt/3dim09.pdf>>, IEEE Workshop on 3-D Digital Imaging and Modeling, (3DIM), 2009, pp. 8.

Levinshtein, et al., "TurboPixels: Fast Superpixels Using Geometric Flows", Retrieved at << http://www.cs.toronto.edu/~kyros/pubs/09.pami.turbopixels.pdf >>, IEEE Transactions on Pattern Analysis and Machine Intelligence, vol. 31, No. 12, Dec. 2009, pp. 1-9.

Caselles, et al., "Geodesic Active Contours", Retrieved at << http://citeseerx.ist.psu.edu/viewdoc/download?doi=10.1.1.21.2196&rep=rep1&type=pdf >>, Fifth International Conference on Computer Vision (ICCV'95), Massachusetts Institute of Technology, Jun. 20-23, 1995, pp. 1-27.

Lorigo, et al., "Codimension—Two Geodesic Active Contours for the Segmentation of Tubular Structures" In Proceedings of International Conference on Information Processing in Medical Imaging, 2000, pp. 8.

Iwanowski, et al., "Morphological Interpolation and Color Images", Retrieved at << http://ieeexplore.ieee.org//stamp/stamp.jsp?tp=&arnumber=00797570 >>, ICIAP, Proceedings of the 10th International Conference on Image Analysis and Processing, Sep. 27-29, 1999, pp. 3.

Omer, et al., "The Bottleneck Geodesic: Computing Pixel Affinity", Retrieved at << http://www.cs.huji.ac.il/~werman/Papers/364_omer_i.pdf >>, CVPR, Proceedings of the 2006 IEEE Computer Society Conference on Computer Vision and Pattern Recognition, vol. 2, Jun. 17-22, 2006, pp. 7.

Yoon, et al., "Regularized Image Sequence Interpolation by Fusing Low Resolution Frames:", Retrieved at << http://ieeexplore.ieee.org//stamp/stamp.jsp?tp=&arnumber=00818660 >>, TENCON 99. Proceedings of the IEEE Region 10 Conference, Dec. 1999, pp. 1271-1274.

"Mathematical Morphology and Image Interpolation", Retrieved at << http://cmm.ensmp.fr/~beucher/interpol/interpol.html >>, Retrieved Date: Dec. 21, 2009, pp. 3.

Criminisi, et al., "GeoS: Geodesic Image Segmentation", Retrieved at << http://research.microsoft.com/pubs/71446/Criminisi_eccv2008.pdf >>, Lecture Notes in Computer Science, vol. 5302, Proceedings of the 10th European Conference on Computer Vision: Part I, Oct. 12-18, 2008, pp. 99-12.

Szeliski, Richard., "Locally Adapted Hierarchical Basis Preconditioning", Retrieved at << http://research.microsoft.com/pubs/70280/tr-2006-38.pdf >>, International Conference on Computer Graphics and Interactive Techniques, ACM SIGGRAPH, Jul. 30-Aug. 3, 2006, pp. 39.

Mahajan, et al., "Moving Gradients: A Path-based Method for Plausible Image Interpolation", Retrieved at << http://graphics.tu-bs.de/colloquium/MovingGradients.pdf >>, ACM Transactions on Graphics (TOG), Proceedings of ACM SIGGRAPH 2009, vol. 28, No. 3, Aug. 2009, pp. 23.

Restriction/Election Office Action cited in U.S. Appl. No. 12/795,031 dated Jan. 15, 2013, 7 pgs.

Reply Restriction/Election Office Action cited in U.S. Appl. No. 12/795,031 dated Feb. 15, 2013, 9 pgs.

* cited by examiner

INTERPOLATED TABLE 402

| | SEED OBJECT #1 | SEED COST #1 | SEED OBJECT #2 | SEED COST #2 | ... | SEED OBJECT #K | SEED COST (#K) |
|---|---|---|---|---|---|---|---|
| NON-SEED OBJECT (1) | SO (1) | 2 | SO (5) | 10 | ... | SO (3) | 35 |
| NON-SEED OBJECT (2) | SO (3) | 4 | SO (13) | 6 | ... | SO (8) | 16 |
| NON-SEED OBJECT (3) | SO (8) | 1 | SO (11) | 33 | ... | SO (91) | 50 |
| NON-SEED OBJECT (4) | SO (5) | 5 | SO (2) | 7 | ... | SO (7) | 15 |
| ... | ... | ... | | ... | ... | ... | ... |
| NON-SEED OBJECT (N) | SO (3) | 7 | SO (8) | 34 | ... | SO (1) | 40 |

CURRENT OBJECT ⟵ 502

- SEED PAIRING (1):
  - SO (15): 2
- SEED PAIRING (2):
  - SO (6): 5
- SEED PAIRING (3):
  - SO (3): 12
- SEED PAIRING (4):
  - SO (32): 25
- SEED PAIRING (5):
  - SO (13): 27

NEIGHBORING OBJECT ⟵ 504
(WITH CALCULATED SEED PAIRINGS)

- CALCULATED SEED PAIRING (1): 508
  - SO (12): 5 + 11 = [16]
- CALCULATED SEED PAIRING (2): 510
  - SO (4): 11 + 11 = [22]
- CALCULATED SEED PAIRING (3):
  - SO (13): 20 + 11 = 31
- CALCULATED SEED PAIRING (4):
  - SO (48): 21 + 11 = 32
- CALCULATED SEED PAIRING (5):
  - SO (7): 32 + 11 = 43

UPDATED CURRENT OBJECT ⟵ 506

- UPDATED SEED PAIRING (1):
  - SO (15): 2
- UPDATED SEED PAIRING (2):
  - SO (6): 5
- UPDATED SEED PAIRING (3):
  - SO (3): 12
- UPDATED SEED PAIRING (4): 512
  - SO (12): 16
- UPDATED SEED PAIRING (5): 514
  - SO (4): 22

DATA DRIVEN INTERPOLATION USING GEODESIC AFFINITY

BACKGROUND

Digital images play a prevalent role in current computing applications. For example, users may upload, alter, and share digital photos; advertising companies may generate digital images for online advertisements; mapping applications may comprise satellite images of various locations on earth; etc. In some instances, digital images may be generated where specific points of the image have known values. In one example, a camera may capture a dense sampling of a scene. A stereo process may recover depth information at some of the points in the image, but not all. In another example, color information of an image may be known at a few specific points within the image (e.g., a user provides brush strokes of color on various regions of objects, such as a brown stroke near a chair and a red stroke near an apple). However, some information may still be missing from such images.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or methods for interpolating/extrapolating values of non-seed objects based upon values of seed objects are disclosed. It may be appreciated that a dimensional array of objects may represent a variety of information, such as an image, a social network, a forest of tree, etc. Some values of objects within the dimensional array may comprise known values, such as depth, color, a trait of a user, whether a tree is infected, etc. It may be appreciated that an object within the dimensional array (e.g., a single point of the dimensional array) may refer to a data point of information (e.g., pixels of an image, people of a social network, etc.). In one example, an image may be represented as a dimensional array comprising non-seed objects (e.g., pixels of unknown values) and seed objects (pixels of known values such as depth or color).

The dimensional array may be interpolated into an interpolated table comprising non-seed objects. Respective non-seed objects within the interpolated table may be associated with a predetermined integer number (k) of seed pairings. A seed pairing may comprise a seed object and a seed cost (e.g., cost of a path from a non-seed object to the seed object). It may be appreciated that seed pairings may be updated based upon looping through non-seed objects within the dimensional array to determine seed pairings having desired seed costs. For example, a desired seed cost may represent a minimal cost path between a non-seed object and a seed object. In this way, updated (k) seed pairings may be determined for a non-seed object. A predetermined integer number (k) of updated seed pairings may be determined for a non-seed object. For example, the updated (k) seed pairings may represent (k) seed objects having minimal cost (a low geodesic distance) indicating a high probability that the non-seed object corresponds to (e.g., have a similar color) the (k) seed objects within the updated (k) seed pairings.

In one example of interpolating the dimensional array into an interpolated table of non-seed objects and updated (k) seed pairings for respective non-seed objects, non-seed objects within the interpolated table may be looped through as current objects to determine (k) seed objects having minimal cost with respect to respective non-seed objects. For current objects, a cost between the current object and a neighboring object may be added to seeds costs within the seed pairings of the neighboring object to obtain calculated seed pairings for the neighboring object. A calculated seed pairing for the neighboring object may comprise a seed object and a calculated seed cost. Seed costs within seed pairings of the current object may be compared with calculated seed costs within the calculated seed pairing of the neighboring object. In this way, the current object may be updated so that the updated (k) seed pairings for the current object have a desired cumulative seed cost, where the updated (k) seed pairings do not comprise redundant seed objects. For example, seed pairings and/or updated (k) seed pairings having a low geodesic distance (e.g., a path of minimal cost between objects) may be retained. In this way, non-seed objects within the interpolated table may be evaluated to determine seed objects having low geodesic distances with respect to the non-seed objects. Values (e.g., a color, a depth, a probability of becoming infected, etc.) may be assigned to non-seed objects based upon values of seed objects within the updated (k) seed pairings of the non-seed objects.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Data, such as images, social networks, a group of individuals, etc. may be represented by dimensional arrays. Objects (individual points of the dimensional array) may represent elements of the data, such as pixels, people, things, etc. As a simple example, a two-dimensional array may comprise objects representing pixels of a two-dimensional image. Unfortunately, the two-dimensional array may lack a complete set of information regarding the objects/pixels. For example, pixel color values, pixel depth values, pixel temperature values, etc. may be known for some, but not all, pixels of the image. That is, color values may be known for some objects (pixels), but not all objects. It may be advantageous to extrapolate the values of objects of known value to objects of unknown value. That is, values for objects of unknown value may be interpolated based upon the objects of known value.

It may be appreciated that a dimensional array may comprise seed objects and non-seed objects. A seed object may refer to an object (e.g., a pixel) having a known value (e.g., a color of red). A non-seed object may refer to an object (e.g., a pixel) having an unknown value (e.g., color is unknown). It may be appreciated that a path refers to a sequence of objects from a non-seed object to a seed object. For example, a path from non-seed object (1) to seed object (5) may involve "walking" through non-seed object (4), non-seed object (6), and non-seed object (15). Costs may be associated with paths. For example, a cost from non-seed object (1) to seed object (5) may comprise a cost from going between non-seed object (1) and non-seed object (4)+a cost from going between non-seed object (4) and non-seed object (6)+a cost from going between non-seed object (6) and non-seed object (15)+a cost from going between non-seed object (15) and seed object (5). A cost may represent a change in similarity measurement between two objects (e.g., a difference in color of luminosity between two objects). A low cost may indicate there is a high similarity between two objects, whereas a high cost may indicate there is minimal similarity between two objects.

It may be appreciated that a geodesic path may be interpreted as a path between two objects (e.g., a non-seed object and a seed object), such that the path has a desired seed cost (e.g., a minimal cost of objects along the path between the non-seed object and the seed object). A geodesic path having a low value (e.g., a minimal cost path) between a non-seed object and a seed object may indicate that there is an increased probability that the non-seed object and the seed object share a similar value. For example, a dimensional array may comprise a plurality of objects representing pixels, where some of the pixels have color values. A high geodesic path between a first pixel of unknown value in the middle of the image and a brown pixel of a known brown value in the lower right of the image may be determined. A low geodesic path between a second pixel of unknown value in the lower middle of the image and the brown pixel of known brown value in the lower right of the image may be determined. It may be appreciated that the second pixel may have a higher probability of being brown than the first pixel because there is a lower geodesic path (e.g., smaller change in color similarity measurements) between the second pixel and the brown pixel (e.g., the brown pixel and the second pixel may belong to a wood floor of an image), although in some instances the pixels may be far apart within the image.

The dimensional array may be interpolated into an interpolated table based upon calculating geodesic distances between non-seed objects (pixel of unknown color values) and seed objects (pixels of known color values). It may be appreciated that costs, seed costs, and calculated seed costs may refer to costs associated with determining a geodesic path based upon how similar a similarity measurement is between objects. In particular, a seed pairing may comprise a seed object and a seed cost representative of a cost associated with a geodesic path between the seed object and a non-seed object. It may be advantageous to determine more than one seed object for a non-seed object, whereas many current techniques may utilize a single seed object for interpolating values of non-seed objects. For example, a predetermined integer number (k) of seed objects (e.g., pixels of known color) may be used to determine a value of a non-seed object. In this way, an interpolated table comprising non-seed objects associated with (k) seed pairings may be generated. In particular, for respective non-seed objects, (k) seed pairings may be determined through an iterative process of "walking" the dimensional array and comparing potential geodesic paths to find desired paths (e.g., minimal cost geodesic paths) of (k) seed objects to a non-seed object. It may be appreciated that a seed pairing may comprise a seed object (e.g., a pixel of known color) and a seed cost (e.g., a cost associated with a desired path between the non-seed object and the seed object). Through this iterative process of updating seed pairings based upon retaining seed pairing having a desired seed cost (e.g., minimum cost path), the interpolated table may be populated with updated (k) seed pairings for respective non-seed objects.

Figure 1:
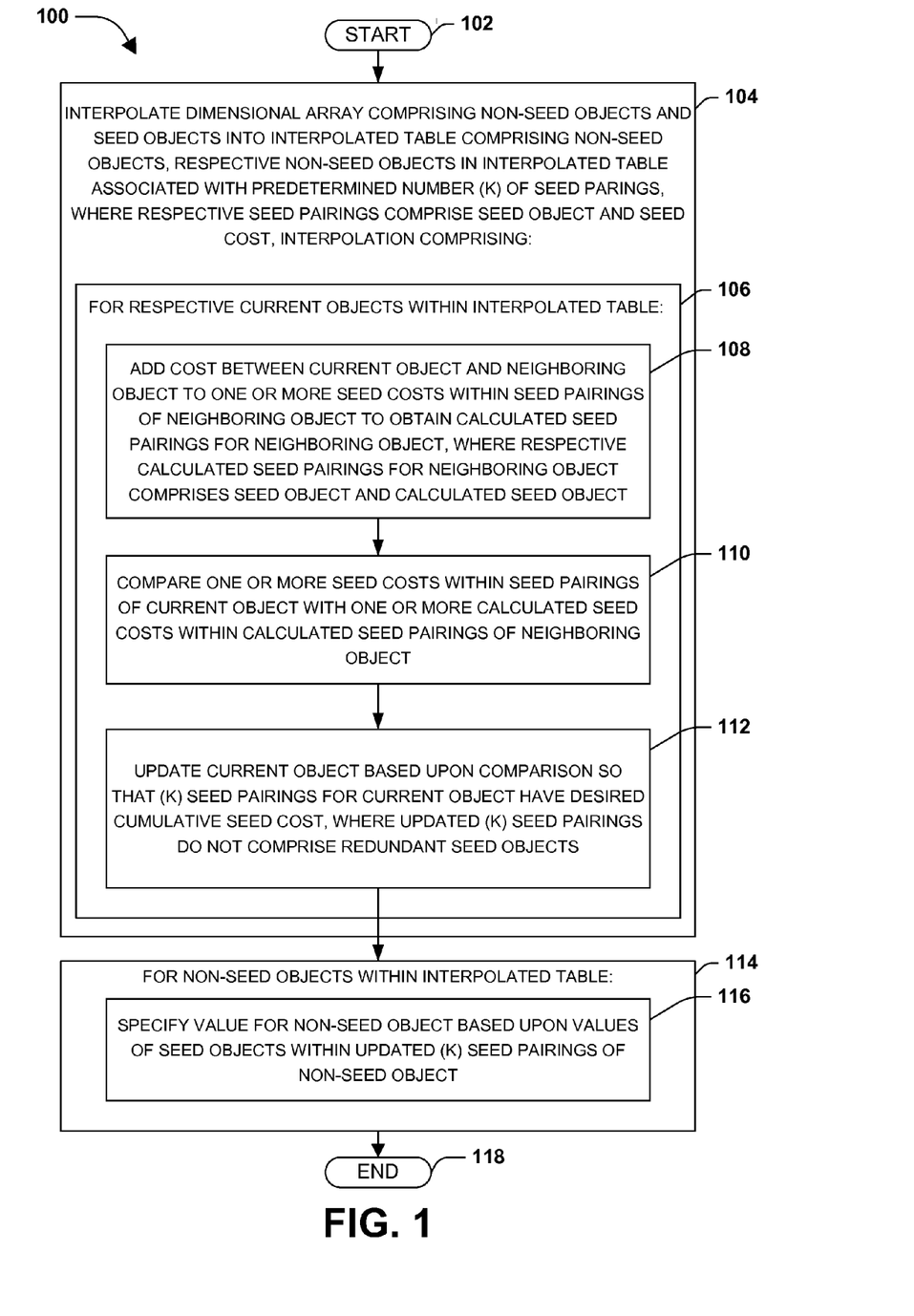
FIG. 1 is a flow chart illustrating an exemplary method of interpolating values of non-seed objects based upon values of seed objects.

One embodiment of interpolating values of non-seed objects based upon values of seed objects is illustrated by an exemplary method 100 in FIG. 1. At 102, the method begins. At 104, a dimensional array may be interpolated into an interpolated table of non-seed objects. The dimensional array may comprise non-seed objects (objects with unknown values) and seed objects (objects of known value). In one example, the dimensional array may represent an image, the non-seed and seed objects may represent pixels, and values of the seed objects may represent pixel measurement data, such as depth or color. In another example, the dimensional array may represent a social network, the non-seed and seed objects may represent users of the social network, and values of the seed objects may represent user traits, such as whether the user is sick. It may be appreciated that the dimensional array may comprise a dimensionality greater than two.

During interpolation, the interpolated table may be filled in and updated with a predetermined integer number (k) of seed pairings for the respective non-seed objects within the interpolated table. In particular, a seed pairing may comprise a seed object (object with known value) and seed cost (a cost to "travel" from a non-seed object to the seed object based upon similarity measurements of objects between the non-seed object and the seed object). Thus, a non-seed object within the interpolated table may have (k) seed pairings representing (k) seed objects having a desired seed cost. For example, a non-seed object may have 8 seed objects having the desired (e.g., minimal) cost between the non-seed object and the 8 seed objects. An iterative process of traversing the dimensional table to "explore" new paths to determine an updated (k) seed pairings having a cumulative desired seed cost may be performed. In this way, neighboring objects of a current object may be evaluated to determine whether one or more seed objects would have a more desired seed cost when "traveling" through the neighboring seed, as opposed to the current paths (seed pairings) of the non-seed object.

At 106, for respective current objects (non-seed objects) within the interpolated table: seed costs may be calculated at 108, seed costs may be compared at 110, and/or current objects may be updated with updated (k) seed pairings having desired cumulative seed cost at 112. In particular, at 108, a cost between a current object and a neighboring object may be added to one or more seed costs of seed pairings of the neighboring object to obtain calculated seed pairings for the neighboring object. A cost between the current object and the neighboring object may be determined based upon comparing a first similarity measurement (e.g., a luminosity measurement, a gradient magnitude, etc.) of the current object with a second similarity measurement of the neighboring object. A low cost may be determined where there is a small difference between the first and second similarity measurements because a small difference in similarity may indicate there is less of a change of some measurement (e.g., a change from dark green to green, as opposed to dark green to red) between the current object and neighboring object. A low cost may indicate that the current object and the neighboring object may bear a close relationship to one another because there is a low cost to travel from the current object to the neighboring object. It may be appreciated that cost may not relate to distance between objects, but rather how similar/dissimilar traits of objects are.

The calculated seed pairings may comprise seed objects and calculated seed costs (e.g., a cost to travel from the current object through the neighboring object to the seed object). It may be appreciated that calculated seed pairings may indicate new potential paths having calculated path costs from the current object through the neighboring object to seed objects of the neighboring object.

At 110, one or more seed costs within seed pairings of the current object may be compared with one or more calculated seed costs within the calculated seed pairings of the neighboring object. That is, seeds costs of the current object (e.g., costs of paths from the current object to (k) seed objects) may be compared with calculated seed costs of the neighboring object (e.g., costs of paths from the current object through the neighboring object to (k) seed objects). In this way, updated (k) seed pairings between the current object and the neighboring object may be retained for the current object. For example, updated (k) seed pairings have minimal costs may be retained for the current object. In particular, at 112, the current object may be updated based upon the comparison so that (k) seed pairings of the current object have a desired cumulative seed cost. The updated (k) seed pairings (e.g., 6 seed pairings derived from the current object and 2 seed pairings derived from the neighboring object) may not comprise redundant seed objects. For example, there is no advantage to have two paths to a single seed object because the objective may be to determine (k) seed objects so that values of the (k) seed objects may be interpolated into a value for the current object. In one example, more than one neighboring objects may be evaluated for a current object.

At 114, for respective non-seed objects within the interpolated table, a value may be specified for a non-seed object based upon values of seed objects within the updated (k) seed pairings of the non-seed object, at 116. In one example, a percentage of outlier values of seed objects may be removed. Thus, the value for the non-seed object may be specified based upon a function of the remaining values of seed objects. In this way, values (e.g., color) of non-seed objects (e.g., pixels of unknown color) may be specified based upon values of seed objects (e.g., pixels of known color) within the updated (k) seed pairings associated with respective non-seed objects, where the (k) seed objects have a desired cumulative seed cost. At 118, the method ends.

Figure 2:
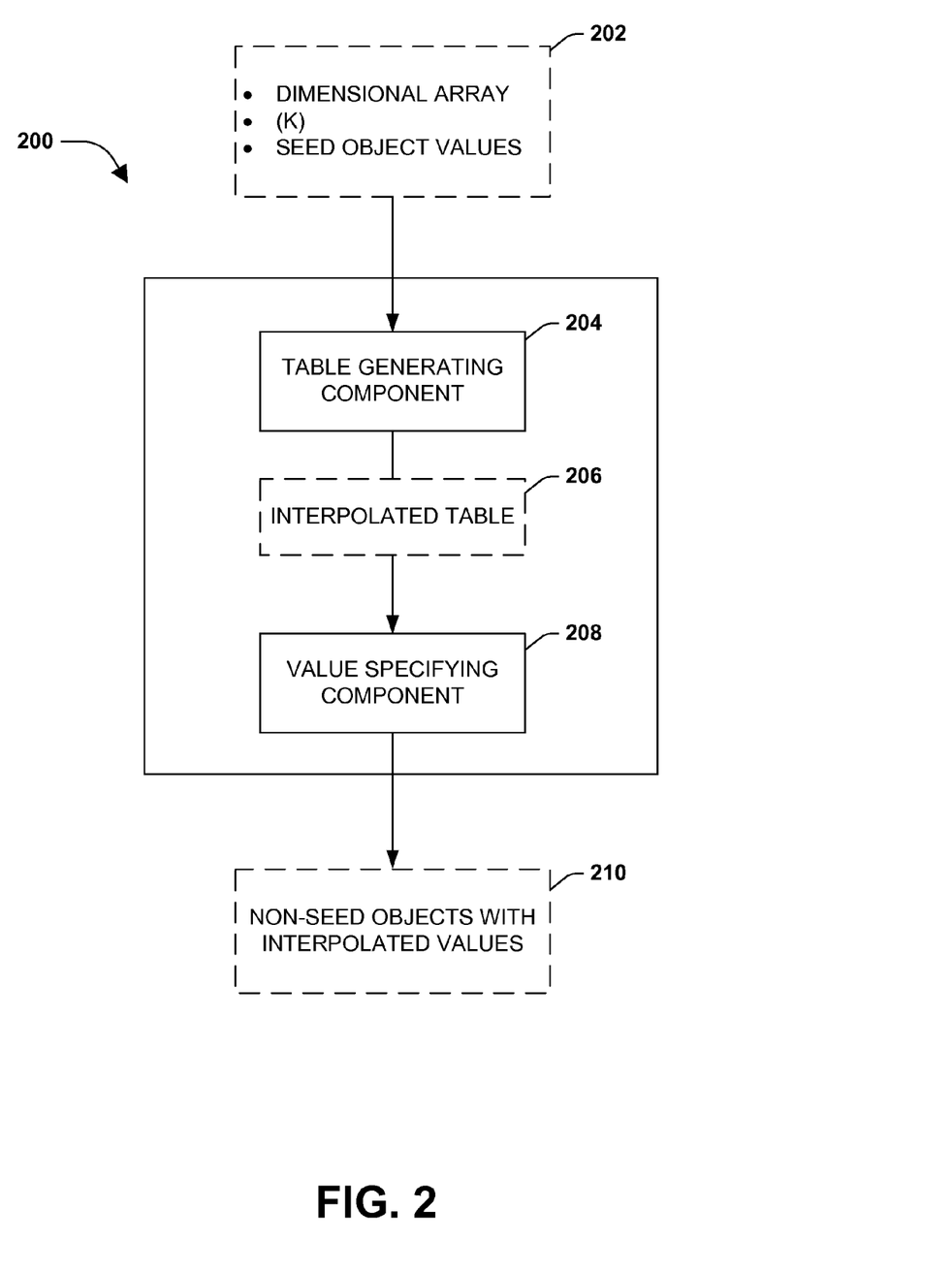
FIG. 2 is a component block diagram illustrating an exemplary system for interpolating values of non-seed objects based upon values of seed objects.

FIG. 2 illustrates an example of a system 200 configured for interpolating values of non-seed objects based upon values of seed objects. The system 200 may be configured to receive input 202 comprising a predetermined integer value (k), values of seed objects, and/or a dimensional array of seed objects and non-seed objects. The dimensional array comprising objects may represent a wide variety of things, such as an image comprising pixels, a social network comprising users, a forest comprising trees, a neighborhood comprising individuals, etc. Values of the objects may represent traits of the objects, such as color of pixels, health status of social network user, income of the individuals, tree growth, etc.

The system 200 may comprise a table generating component 204 and/or a value specifying component 208. The table generating component 204 may be configured to generate an interpolated table 206 comprising non-seed objects associated with updated (k) seed pairings having a desired cumulative seed cost. It may be appreciated that a seed pairing (e.g., an updated seed pairing) may comprise a seed object and a seed cost with respect to a non-seed (e.g., a cost to travel between the non-seed and the seed object within the dimensional array). The table generating component 204 may generate the interpolated table 206 based upon calculating, comparing, and retaining seed pairings based upon seed costs between non-seed objects and seed objects within the dimensional array. It may be appreciated that seed pairings for a non-seed object may not comprise redundant seed objects. It may be appreciated that the dimensional array may have a dimensionality greater than two.

In one example of generating the interpolated table 206, the table generating component 204 may be configured to calculate seed costs of a neighboring object of a current object, compare the calculated seed costs within seed costs of the current object, and retain updated (k) seed pairings having a desired cumulative seed cost. In particular, for respective current objects within the interpolated table 206, the table generating component 204 may be configured to add a cost between a current object and a neighboring object to one or more seed costs within seed pairings of the neighboring object to obtain calculated seed pairings for the neighboring object. It may be appreciated that calculated seed pairings may indicate a path cost between the current object through the neighboring object to a seed object. Respective calculated seed pairings for the neighboring object may comprise a seed object and a calculated seed cost. The table generating component 204 may be configured to determine a cost between the current object and the neighboring object based upon comparing a first similarity measurement of the current object a second similarity measurement of the neighboring object. That is, the cost may reflect how similar a trait of the current object and the neighboring object is. For example, a high cost may reflect that a difference in gradient values between a current pixel and a neighboring pixel is large, where values of seeds are related to depth.

The table generating component 204 may be configured to compare seed costs within seed pairings of the current object with calculated seed costs within the calculated seed pairings of the neighboring object. In this way, the current object may be updated such that updated (k) seed pairings of the current object have a desired cumulative seed cost. In this way, the interpolated table 206 may be generated. The interpolated table 206 may comprise non-seed objects, where respective non-seed objects are associated with updated (k) seed pairings having a desired cumulative seed cost. For example, a non-seed object may be associated with updated (k) seed pairings having a lowest cumulative seed cost, which may indicate that the non-seed object may have a value similar to the values of the (k) seed pairings. For example, values of objects may relate to depth. Seed objects may have values ranging from 0 to 50. After interpolation, a non-seed object may be associated with updated (k) seed pairings having values for depth ranging between 8 and 10. Because the updated (k) seed pairings may have been chosen based up the updated (k) seed pairings having minimal cost paths (e.g., a lowest change in gradient along geodesic paths between the non-seed object and (k) seed objects), it may be appreciated that the non-seed object may have a depth value close to the range between 8 and 10.

It may be appreciated that more than one neighboring object may be compared with the current object. It may be appreciated that the dimensional array may be traverse multiple times using forward scans and/or backward scans to determine updated (k) seed pairings having a lowest cumulative seed cost. That is, k seed pairings may be updated as the dimensional array is traversed (e.g., current objects are compared with neighboring objects). The dimensional array may be traversed multiple times because new potential paths may be discovered as the dimensional array is traversed.

The value specifying component 208 may be configured to specify values for non-seed objects within the interpolated table to generate non-seed objects with interpolated values 210. A value may be specified for a non-seed object based upon values of seed objects within updated (k) seed pairings associated with the non-seed object. In one example, a percentage of outlier values of seed objects may be removed. In particular, a value may be specified for the non-seed object based upon an average of the remaining values of the seed objects. In this way, a value for a non-seed object may be specified based upon values of (k) seed objects (e.g., 8 seed objects having a minimal geodesic distance to the non-seed object).

Figure 3:
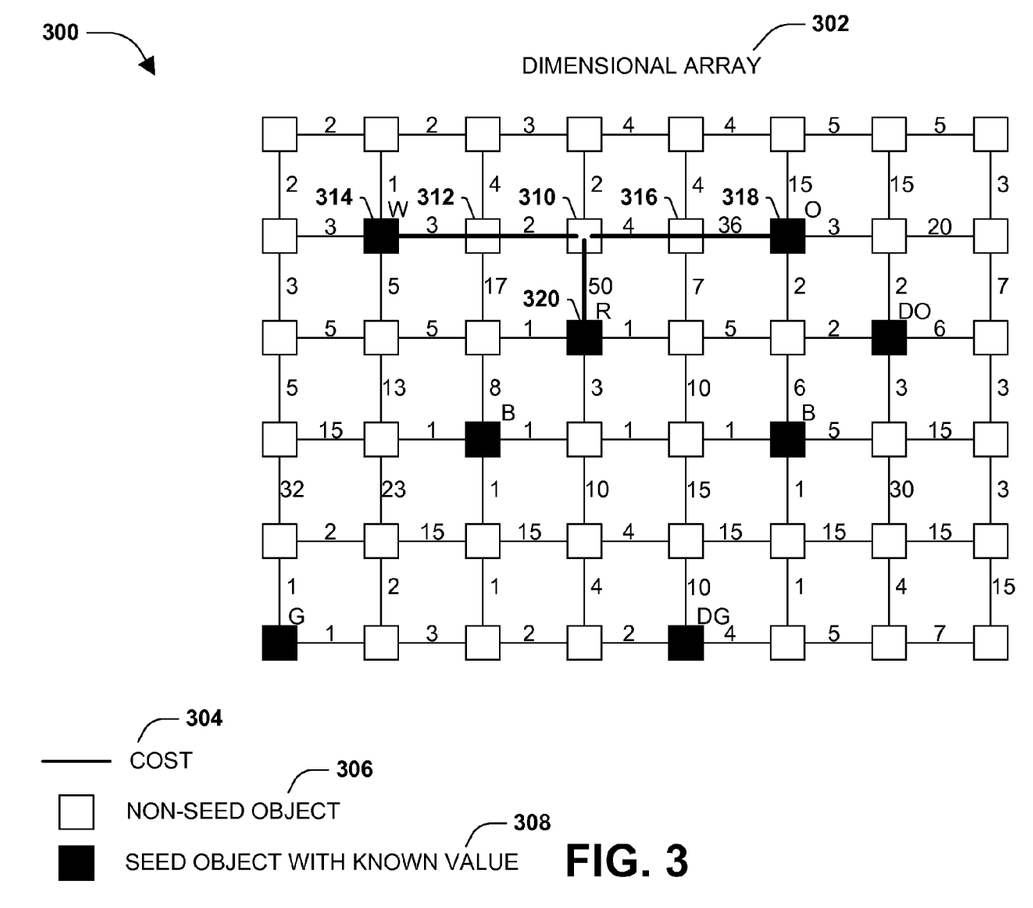
FIG. 3 is an illustration of an example of a dimensional array comprising non-seed objects and seed objects with known values.

FIG. 3 illustrates an example 300 of a dimensional array 302 comprising non-seed objects 306 and seed objects 308 with known values (e.g., seed object (1) 314 with a color value of white, seed object (2) 318 with a color value of orange, seed object (3) 320 with a color value of red, etc.). Costs 304 between objects may be determined based upon similarity measurements between objects. In one example, a cost of 50 between non-seed object (1) 310 and seed object (3) 320 may be based upon a low similarity of luminosity between the respective objects. In another example, a cost of 2 between non-seed object (1) 310 and non-seed object (2) 312 may be based upon a high similarity of luminosity between the respective objects. In this way, a variety of similarity measurements, which may reflect traits of objects (e.g., gradient, luminosity, social network user personality traits, etc.), may be utilized in determining costs 304 between objects.

It may be appreciated that costs 304 may not correlate to distance, but rather similarity, between objects. For example, non-seed object (1) 310 is adjacent to seed object (3) 320. However, a seed cost of 50 is associated with "traveling" from non-seed object (1) 310 to seed object (3) 320 because the respective objects many have little to no similarity with regards to some trait (e.g., luminosity). That is, the high seed cost of 50 may indicate that non-seed object (1) 310 and seed object (3) 320 may not share a similar value (e.g., non-seed object (1) 310 is not red). Similarly, there is a cost of 4 between non-seed object (1) 310 and non-seed object (3) 316, along with a cost of 36 between non-seed object (3) 316 and seed object (2) 318. That is, there is a seed cost of 40 to "travel" from non-seed object (1) 310 through non-seed object (3) 316 to seed object (2) 318. The high seed cost of 40 (4+36) indicates that non-seed object (1) and seed object (2) 318 may not share a similar value (e.g., non-seed object (1) 310 is not orange). It may be appreciated that there are two jumps (non-seed object (1) 310 to non-seed object (3) 316 and non-seed object (3) 316 to seed object (2) 318) from non-seed object (1) 310 to seed object (2) 318, yet there is a smaller seed cost associated with the path in comparison to the single jump from non-seed object (1) 310 to seed object (3) 320 having a larger seed cost.

In contrast, there is a small seed cost of 5 (2+3) between non-seed object (1) 310 and seed objection (1) 314 when "traveling" through non-seed object (2) 312. The small seed cost of 5 may indicate that non-seed object (1) 310 and seed object (1) 314 may share a similar value (e.g., non-seed object (1) 310 may have a color similar to white). In this way, the dimensional array 302 may be traversed to determine seed costs between non-seed objects and seed objects. In particular, for respective non-seed values, values of (k) seed objects having desired seed costs may be utilized in specifying values for a non-seed object.

In one example of generating an interpolated table using the dimensional array 302, non-seed objects 306 within the dimensional array 302 may be sequentially traversed forwards and/or backwards. In particular, a loop of the dimensional array 302 may be performed, where a current object is evaluated with neighboring objects in an attempt to find updated (k) seed objects having a desired cumulative seed cost (e.g., a first non-seed object is evaluated as a current object against neighboring objects, a second non-seed object is evaluated as a current object against neighboring objects, etc.). It may be appreciated that a loop may be performed one or more times because the updated (k) seed values may change for a non-seed object based upon the "discovery" of new desired paths from the non-seed object to seed objects.

Figure 4:
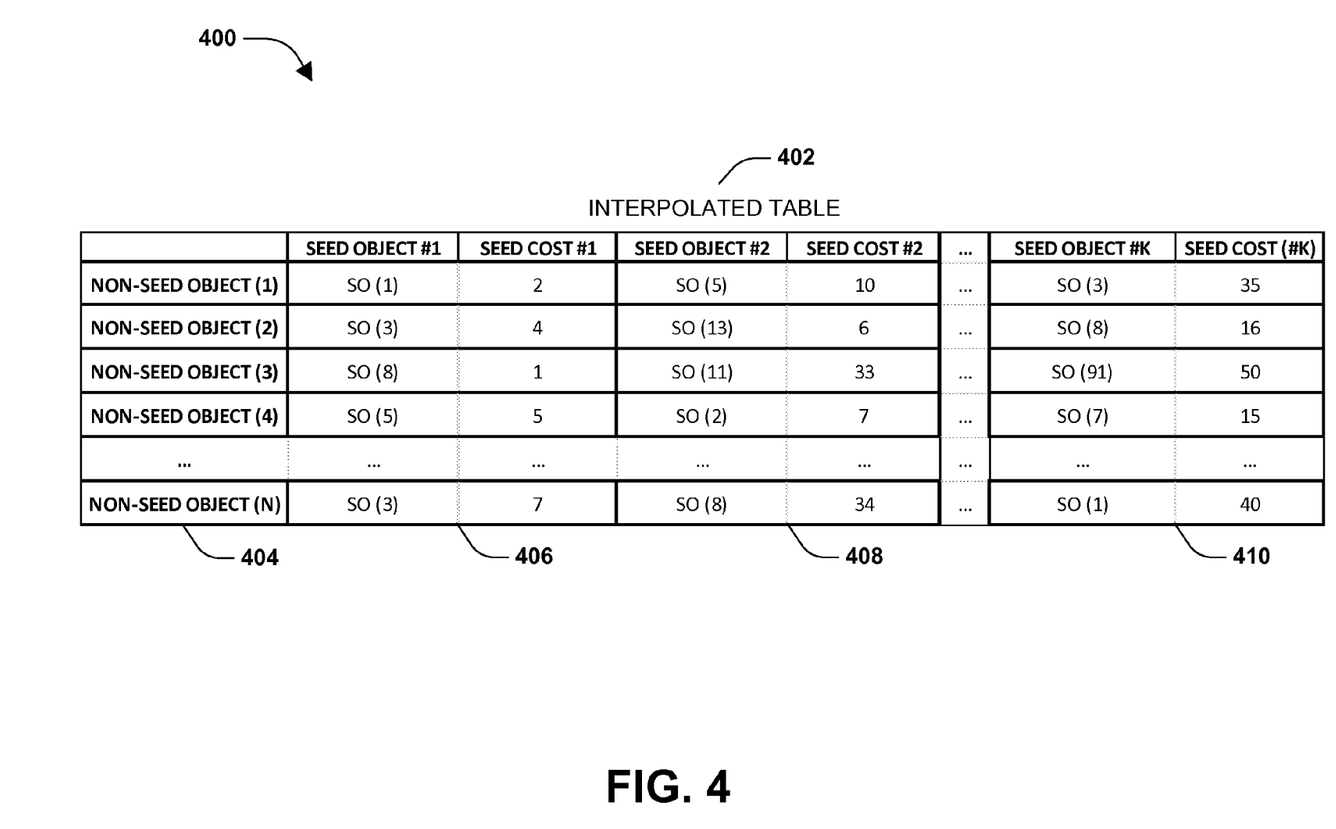
FIG. 4 is an illustration of an example of an interpolated table.

FIG. 4 illustrates an example 400 of an interpolated table 402. The interpolated table 402 may comprise non-seed objects (e.g., non-seed object (1), non-seed object (2), non-seed object (N) 404, etc.). It may be appreciated that the interpolated table 402 may be generated and/or update based upon traversing a dimensional array (e.g., dimensional array 302 of FIG. 3). In this way, updated (k) seed pairings may be determined for respective non-seed objects. A seed pairing may comprise a seed object and a seed cost. The seed cost may represent a cost to "travel" from a non-seed object to the seed cost, which may indicate how similar the non-seed object and the seed cost may be. For example, non-seed object (N) 404 may be associated with a first seed pairing 406 (seed object (3) with a seed cost of 7), a second seed pairing 408 (seed object (8) with a seed cost of 34) . . . a (k) seed pairing 410 (seed object (1) with a seed cost of 40). It may be appreciated that the seed pairings for non-seed object (N) may be updated based upon comparing non-seed object (N) with neighboring objects to determine whether the same of different seed objects may have a more desirable seed cost. In this way, the non-seed object (N) may be associated with different updated (k) seed pairings as the dimensional array is traversed.

In one example, seed pairings having a low seed cost may be desired. For example, the first seed pairing 406 comprising the seed object (3) with a seed cost of 7 may be more desirable than a seed pairing comprising a seed object (x) with a seed cost of 50, for example. The low seed cost of 7 may indicate that there is a greater similarity between the non-seed object (N) 404 and the seed object (3), than the seed object (x). In this way, the interpolated table may be generated and/or updated with updated (k) seed pairings for respective non-seed objects.

Figure 5:
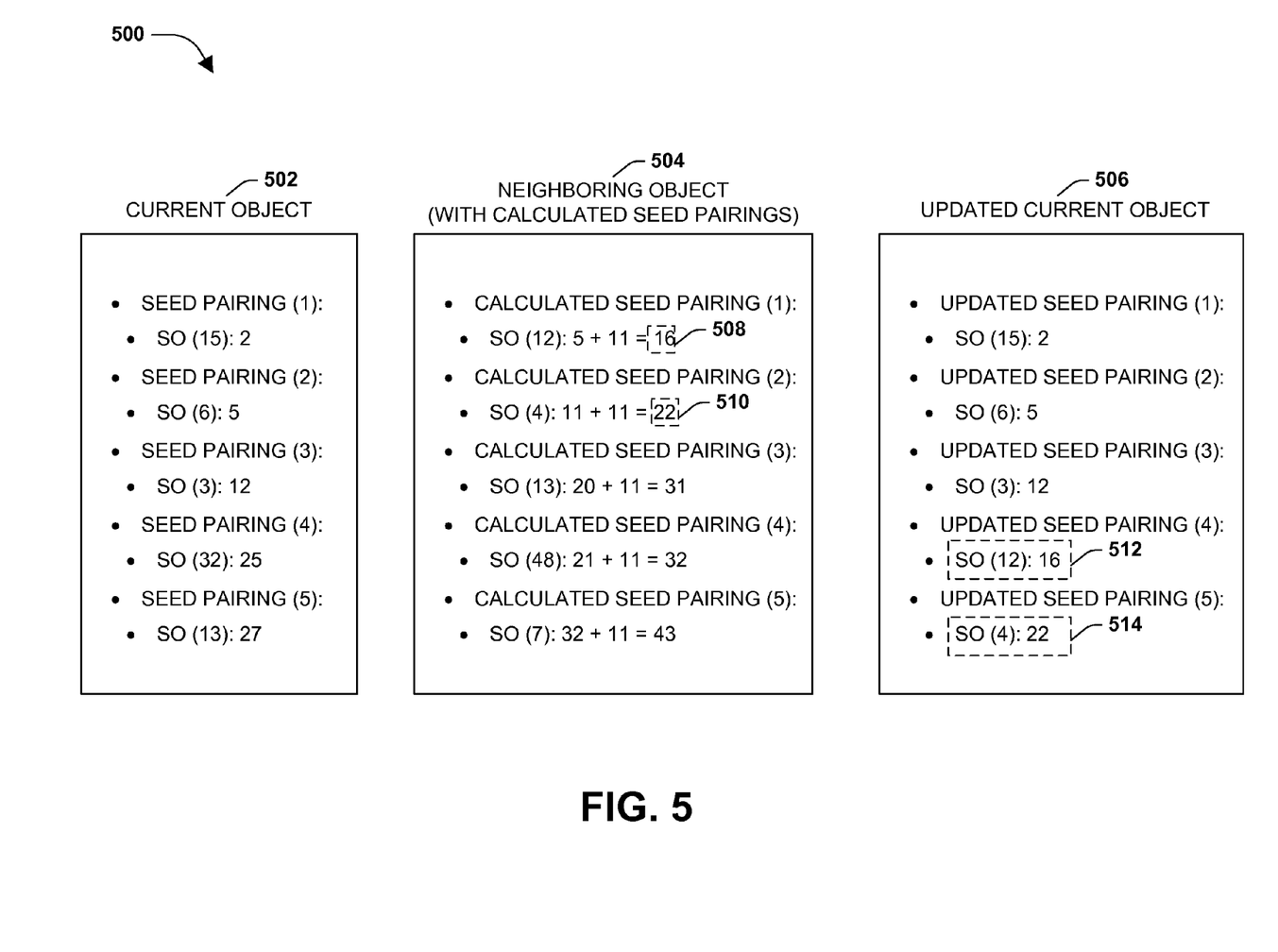
FIG. 5 is an illustration of an example of updating a current object with updated (k) seed pairings having a desired cumulative seed cost.

FIG. 5 illustrates an example 500 of updating a current object 502 with updated (k) seed pairings having a desired cumulative seed cost. The current object 502 may represent a non-seed object within an interpolated table. The current object 502 may be associated with 5 seed pairings comprising seed objects and seed costs (e.g., seed pairing (1): seed object (15) with a cost of 2; seed pairing (2): seed object (6) with a seed cost of 5; seed pairing (3): seed object (3) with a seed cost of 13; etc.). The current object 502 may be updated with updated (k) seed pairings based upon comparing the current object 502 with a neighboring object 504 to determine updated seed pairings (e.g., seed pairings of the current object 502 and/or calculated seed pairings of the neighboring object 504) having a desired cumulative seed cost. For example, a desired cumulative seed cost may be a minimal cumulative seed cost (e.g., 5 seed pairings having the lowest geodesic distances). It may be appreciated that one or more of the original seed pairings of the current object 502 may be retained as updated seed pairings if the one or more original seed pairings have a desired seed cost.

In one example, the current object 502 may be compared with the neighboring object 504. In particular, a cost between the current object 502 and the neighboring object 504 may be added to seed costs of seed pairings of the neighboring object 504 to obtain calculated seed pairings. For example, a cost of 11 between current object 502 and neighboring object 504 may be determined based upon a similarity measurement between respective objects. The cost of 11 may be added to seed costs of seeding pairings. For example, seed pairing (1) comprises a seed object (12) having a seed cost of 5. The cost of 11 may be added to the seed cost of 5 to obtain a calculated seed cost (1) 508 of 16 for calculated seed pairing (1). Seed pairing (2) comprises a seed object (4) having a seed cost of 11. The cost of 11 may be added to the seed cost 11 to obtain a calculated seed cost (2) 510 of 22 for calculated seed pairing (2). In this way, calculated seed pairings may be determine for the neighboring object 504.

The seed pairings of the current object 502 may be compared with calculated seed pairings of the neighboring object 504 to update the current object 502 into an updated current object 506 comprising updated (k) seed pairings having a desired cumulative seed cost. In one example, the 5 seed objects/calculated seed objects having the lowest seed cost may be updated as the updated (k) seed pairings for the updated current object 506. To obtain the 5 seed pairings with lowest seed cost, the updated current object 506 may be updated with a seed pairing (1) comprising a seed object (15) with a seed cost of 2, a seed pairing (2) comprising a seed object (6) with a seed cost of 5, a seed pairing (3) comprising a seed object (3) with a seed cost of 12, a seed pairing (4) 512 comprising a seed object (12) with a seed cost of 16, and a seed pairing (5) 514 comprising a seed object (4) with a seed cost of 22. It may be appreciated that seed pairings (1) through (3) were derived from seed pairings of the current object 502, while seed pairing (4) 512 and seed pairing (5) 514 were derived from calculated seed pairings of the neighboring object 504. In this way, the updated current object 506 may comprise updated (k) seed parings having a lowest cumulative seed cost.

Figure 6:
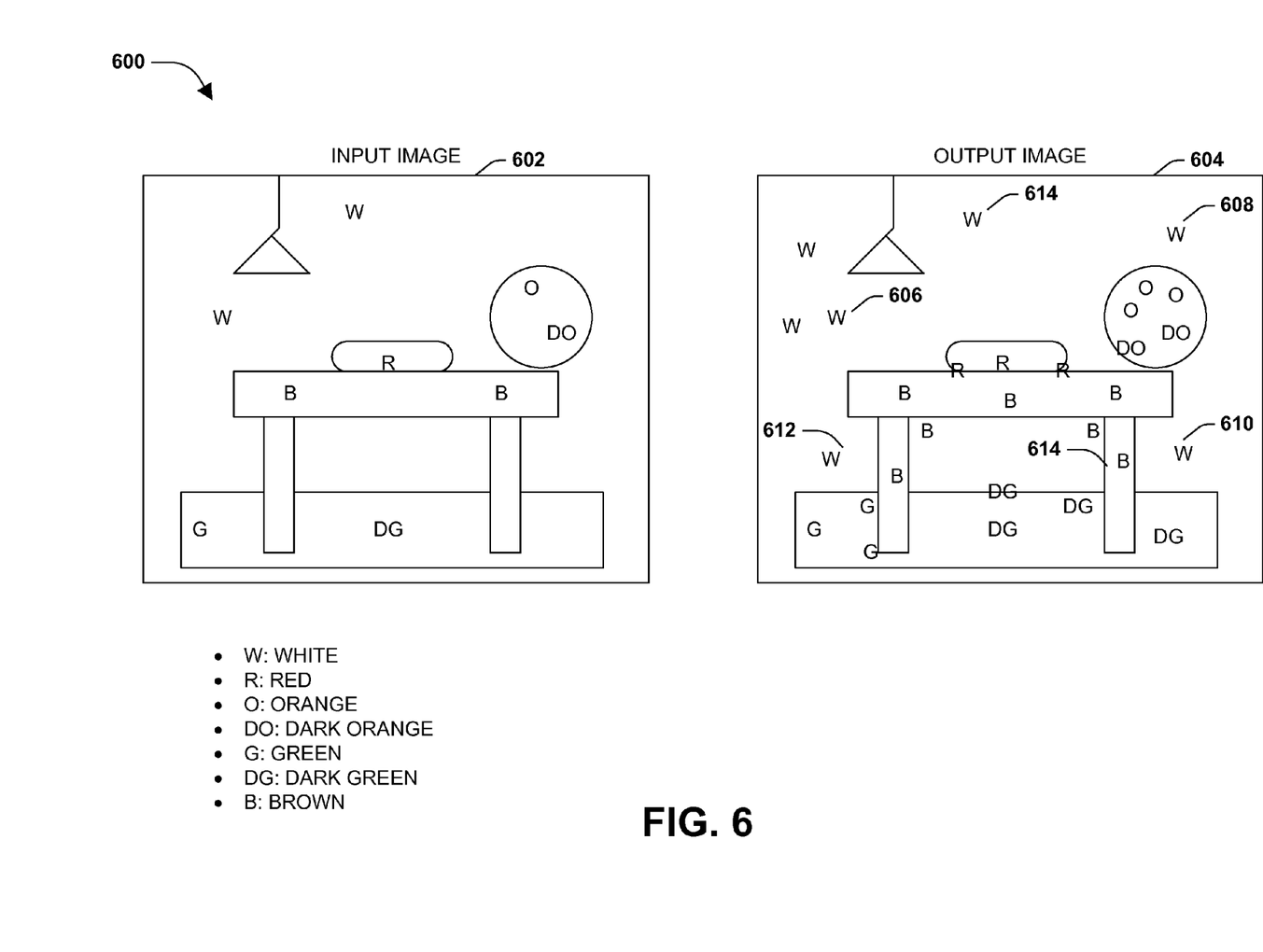
FIG. 6 is an illustration of an example of coloring an image based upon interpolating color values of known pixels to pixels of unknown color value.

FIG. 6 illustrates an example 600 of coloring an image based upon interpolating color values of known pixels to unknown pixels of unknown color value. An input image 602 may comprise a scene of a table, a lamp, a rug, a dish, and a basketball. The input image 602 may have minimal color data associated with a portion of the pixels of the input image 602 (e.g., 8 pixels may have a known color value). A dimensional array may be generated based upon the input image 602. For example, objects of the dimensional array may represent pixels of the input image 602. The dimensional array may comprise seed objects representing known pixels of known color and non-seed objects representing unknown pixels of unknown color.

The dimensional array of the input image 602 may be interpolated to generate an interpolated table. The interpolated table may comprise non-seed objects (unknown pixels of unknown color value), where respective non-seed objects are associated with a predetermined number (k) of non-seed objects (known pixels of known color value). In this way, color values may be assigned to unknown pixels to generate an output image 604.

In one example of generating the output image 604, one or more unknown pixels may be "colored" white based upon an interpolated table. For example, white pixel 606, white pixel 614, and/or other known pixels may be represented as seed objects. Unknown pixel (1) 608, unknown pixel (2) 610, and/or unknown pixel (3) 612, along with other unknown pixels may be represented as non-seed objects. The interpolated table may be generated such that unknown pixel (1) 608 may be associated with (k) known pixels, unknown pixel (2) 610 may be associated with (k) known pixels, and/or unknown pixel (3) 612 may be associated with (k) known pixels. For example, unknown pixel 610 may be associated with white pixel 606 and/or white pixel 614 because "traveling" from unknown pixel 610 to white pixel 606 and/or white pixel 614 may have a low cost (a low geodesic path). For example, there may be a low cost between unknown pixel 610 and white pixel 606 because there may be a high similarity between pixels along the path from unknown pixel 610 to white pixel 606. In contrast, a high cost may be associated with traveling between unknown pixel 610 and brown pixel 616 because there may be a low similarity between pixels along the path from unknown pixel 610 to brown pixel 616. In this way, pixels may be colored within the output image 604 based upon color values of known pixels.

In another example of coloring an image represented by a dimensional array, the dimensional array may comprise unknown color pixels and known color pixels. The dimensional array may be interpolated into an interpolated table comprising unknown color pixels. The unknown color pixels in the interpolated table may be associated with a predetermined number (k) of pixel pairings, where respective pixel pairings may comprise a known color pixel and a color cost. In particular, for respective current pixels (unknown color pixels) within the interpolated table, a cost between a current pixel and a neighboring pixel may be added to color costs within pixel pairings of the neighboring pixel to obtain calculated pixel pairings for the neighboring pixel. A calculated pixel paring may comprise a known color pixel and a calculated color cost (e.g., a cost representing similarity measurements between pixels in a path from the unknown color pixel through the neighboring pixel to the known color pixel). One or more color costs within pixel pairings of the current pixel may be compared with one or more calculated color costs within the calculated pixel pairings of the neighboring pixel. In this way, the current pixel may be updated based upon the comparison so that updated (k) pixel pairings for the current pixel have a desired cumulative color cost and no redundant known color pixels. Colors may be specified for unknown color pixels based upon colors of known color pixels within updated (k) pixel parings of respective unknown color pixels.

Figure 7:
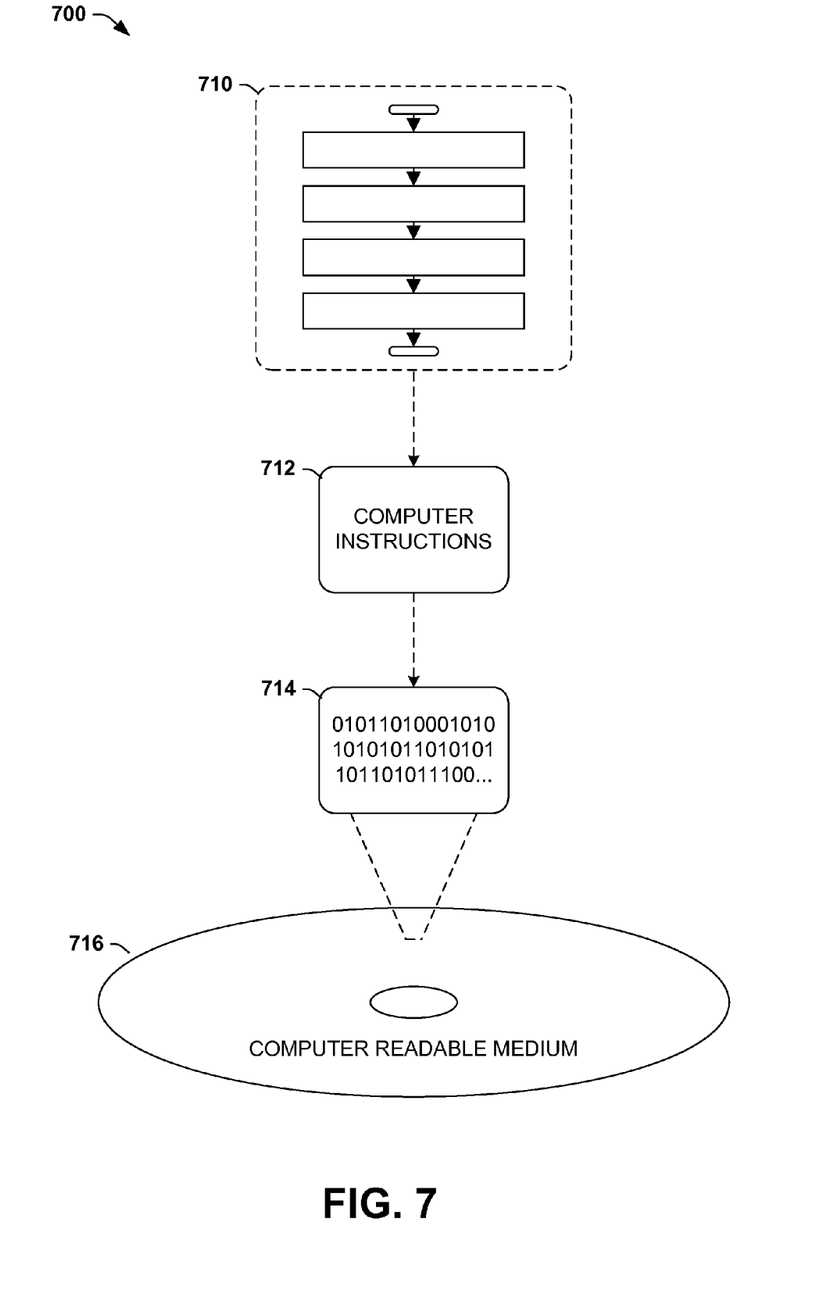
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as the exemplary method 100 of FIG. 1, for example. In another such embodiment, the processor-executable instructions 712 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
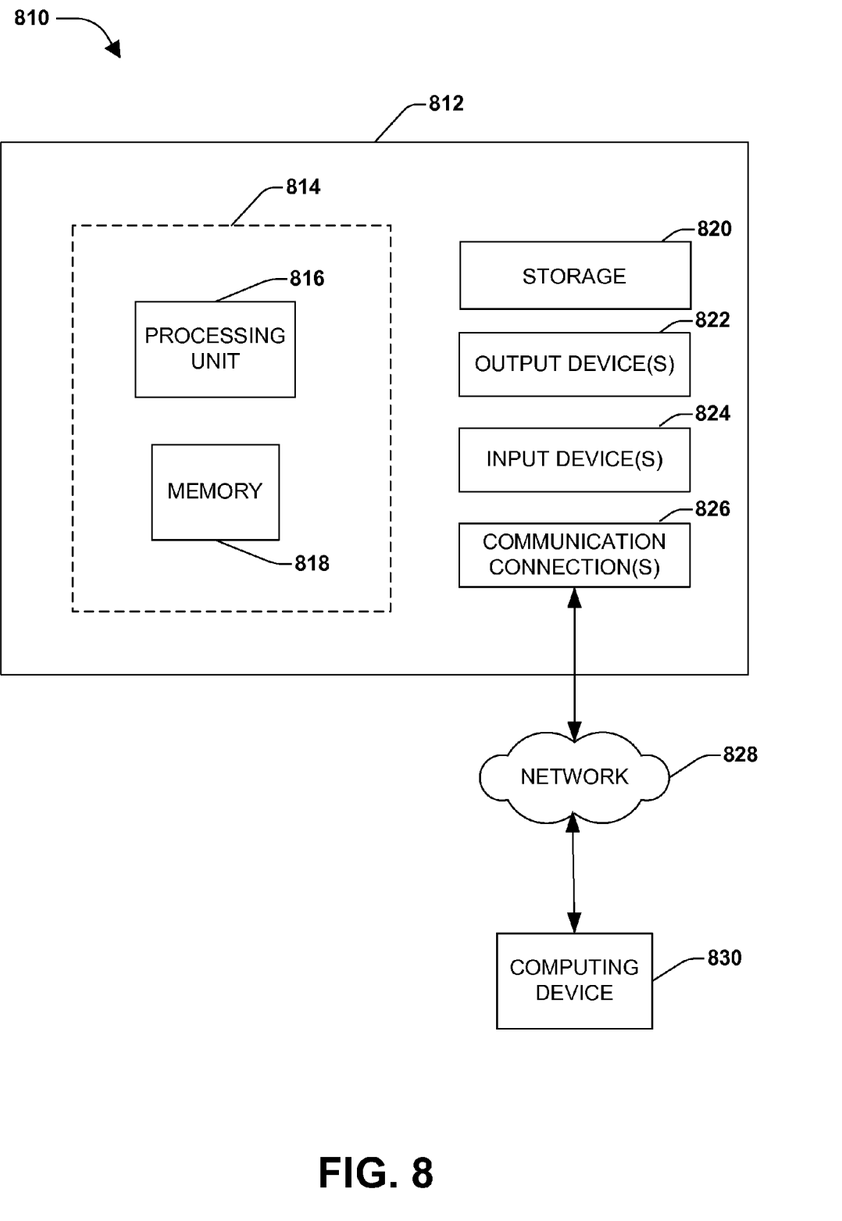
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1384), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit implemented in hardware, for interpolating values of non-seed objects based upon values of seed objects, comprising:

interpolating a dimensional array comprising non-seed objects and seed objects into an interpolated table comprising non-seed objects, respective non-seed objects in the interpolated table associated with a predetermined number (k) of seed pairings, where respective seed pairings comprise a seed object and a seed cost, the interpolating comprising:

for respective current objects within the interpolated table:

adding a cost between a current object and a neighboring object to one or more seed costs within seed pairings of the neighboring object to obtain calculated seed pairings for the neighboring object, where respective calculated seed pairings for the neighboring object comprise a seed object and a calculated seed cost;

comparing one or more seed costs within seed pairings of the current object with one or more calculated seed costs within the calculated seed pairings of the neighboring object; and updating the current object based upon the comparison so that (k) seed pairings for the current object have a desired cumulative seed cost, resulting in updated (k) seed pairings, where the updated (k) seed pairings do not comprise redundant seed objects; and for non-seed objects within the interpolated table:

specifying a value for a non-seed object based upon values of seed objects within updated (k) seed pairings of the non-seed object.

2. The method of claim 1, the specifying a value for a non-seed object comprising:

removing a percentage of outlier values of seed objects; and specifying the value for the non-seed object based upon a function of one or more remaining values of seed objects.

3. The method of claim 1, the predetermined number (k) is an integer greater than 1.

4. The method of claim 1, the dimensional array representing an image, the non-seed objects and seed objects representing pixels of the image, one or more values of the non-seed objects and seed objects representing pixel measurement data, and one or more costs representing a change in pixel measurement data.

5. The method of claim 1, the dimensional array representing an image, the non-seed objects and seed objects representing pixels of the image, one or more values of the non-seed objects and seed objects representing depth, and one or more costs representing a change in depth.

6. The method of claim 1, the dimensional array representing a social network, the non-seed objects and seed objects representing users of the social network, and one or more values of the non-seed objects and seed objects representing a user trait.

7. The method of claim 1, the dimensional array comprising a dimensionality greater than two.

8. The method of claim 1, the interpolating comprising:
determining the cost between the current object and the neighboring object based upon a first similarity measurement of the current object compared with a second similarity measurement of the neighboring object.

9. The method of claim 8, the determining the cost comprising:
comparing a first gradient magnitude of the current object with a second gradient magnitude of the neighboring object.

10. A system, implemented at least in part via a processing unit implemented in hardware, for interpolating values of non-seed objects based upon values of seed objects, comprising:
a table generating component configured to:
generate an interpolated table comprising non-seed objects based upon seed costs between non-seed objects and seed objects within a dimensional array, respective non-seed objects in the interpolated table associated with a predetermined number (k) of seed pairings comprising seed objects having a desired cumulative seed cost, where the seed pairings do not comprise redundant seed objects; and
a value specifying component configured to:
for non-seed objects within the interpolated table:
specify a value for a non-seed object based upon values of seed objects within seed pairings of the non-seed object.

11. The system of claim 10, the table generating component configured to:
traverse the dimensional array in a backward scan to determine k) seed pairings having a lowest cumulative seed cost.

12. The system of claim 10, the dimensional array having a dimensionality greater than 2.

13. The system of claim 10, the value specifying component configured to:
remove a percentage of outlier values of seed objects; and
specify the value for the non-seed object based upon an average of one or more remaining values of seed objects.

14. The system of claim 10, one or more values of the seed objects and non-seed objects representing pixel colors.

15. The system of claim 10, one or more values of the seed objects and non-seed objects representing depth.

16. The system of claim 10, the table generating component configured to:
for current objects within the interpolated table:
add a cost between a current object and a neighboring object to one or more seed costs within seed pairings of the neighboring object to obtain calculated seed pairings for the neighboring object, where respective calculated seed pairings for the neighboring object comprise a seed object and a calculated seed cost;
compare one or more seed costs within seed pairings of the current object with one or more calculated seed costs within the calculated seed pairings of the neighboring object; and
update the current object based upon the comparison so that (k) seed pairings for the current object have a desired cumulative seed cost, where the updated (k) seed pairings do not comprise redundant seed objects.

17. The system of claim 16, the table generating component configured to:
determine the cost between the current object and the neighboring object based upon a first similarity measurement of the current object compared with a second similarity measurement of the neighboring object.

18. The system of claim 10, the table generating component configured to:
traverse the dimensional array in a forward scan to determine (k) seed pairings having a desired cumulative seed cost.

19. The system of claim 18, the table generating component configured to:
traverse the dimensional array more than five times.

20. A method for interpolating colors of unknown color pixels based upon colors of known color pixels, comprising:
interpolating a dimensional array comprising unknown color pixels and known color pixels into an interpolated table comprising unknown color pixels, respective unknown color pixels in the interpolated table associated with a predetermined number (k) of pixel pairings, where respective pixel pairings comprise a known color pixel and a color cost, the interpolating comprising:
for respective current pixels within the interpolated table:
adding a cost between a current pixel and a neighboring pixel to one or more color costs within pixel pairings of the neighboring pixel to obtain calculated pixel pairings for the neighboring pixel, where respective calculated pixel pairings for the neighboring pixel comprise a known color pixel and a calculated color cost;
comparing one or more color costs within pixel pairings of the current pixel with one or more calculated color costs within the calculated pixel pairings of the neighboring pixel; and
updating the current pixel based upon the comparison so that (k) pixel pairings for the current pixel have a desired cumulative color cost, resulting in updated (k) pixel pairings, where the updated (k) pixel pairings do not comprise redundant known color pixels; and
for unknown color pixels within the interpolated table:
specifying a color for an unknown color pixel based upon colors of known color pixels within updated (k) pixel pairings of the unknown color pixel.

* * * * *